June 20, 1961   C. L. MEHLTRETTER ET AL   2,989,371
PROCESS FOR SEPARATION OF SODIUM METAPERIODATE
FROM SODIUM SULFATE
Filed Aug. 1, 1958                              2 Sheets-Sheet 1

INVENTORS
CHARLES L. MEHLTRETTER
CARL S. WISE

BY
ATTORNEY 2,989,371
PROCESS FOR SEPARATION OF SODIUM META-
PERIODATE FROM SODIUM SULFATE
Charles L. Mehltretter and Carl S. Wise, Peoria, Ill., assignors to the United States of America as represented by the Secretary of Agriculture
Filed Aug. 1, 1958, Ser. No. 752,679
4 Claims. (Cl. 23—85)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for the separation of crystalline sodium metaperiodate from aqueous solutions. In particular it relates to the separation of sodium metaperiodate from aqueous solutions containing dissolved sodium sulfate. In U.S. Patent No. 2,830,941, it has been disclosed that iodine can be completely oxidized electrolytically to periodic acid using an anolyte solution containing sodium sulfate. The final electrolyzed solution thus contains both periodic acid and sodium sulfate and may be used directly for the oxidation of organic compounds. The electrolysis solutions may also be neutralized with sodium hydroxide to form a solution of sodium periodate and sodium sulfate. Sodium metaperiodate is a chemical reagent of value for the analysis of glycerine and other polyhydroxy compounds, and it is preferred to have it in pure crystalline form for this purpose rather than in aqueous solution with sodium sulfate.

Uncontrolled evaporation of the neutralized electrolysis liquor produces a mixture of crystalline sodium metaperiodate and sodium sulfate which is unsuitable for use in analytical procedures.

Figure 1:
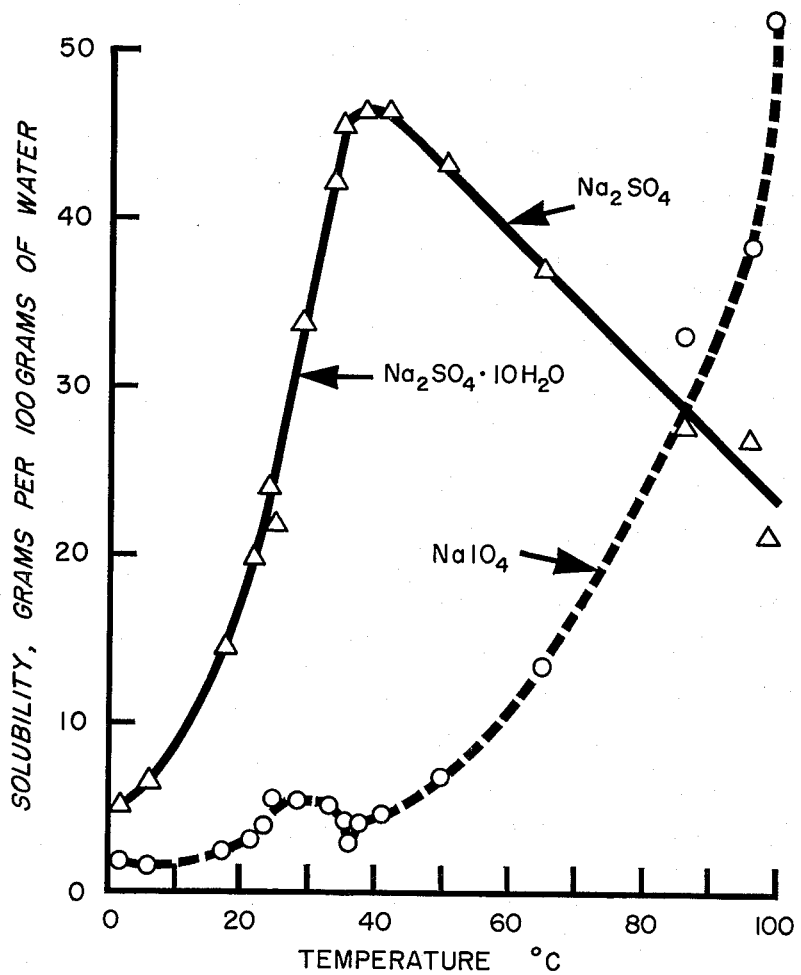

It has been found that when the evaporation is conducted under the specific conditions disclosed in this invention, it is possible to crystallize out at least 90 percent of the sodium metaperiodate in pure form from solutions containing large amounts of sodium sulfate. This novel and efficient separation of sodium metaperiodate from sodium sulfate by fractional crystallization was discovered by studying the phase diagrams which represent the equilibrium existing in aqueous solutions of these salts. Because of the leak of data required for the preparation of such diagrams, the solubilities of pure sodium metaperiodate and sodium sulfate were determined at various temperatures in aqueous solutions containing both salts in the solid phase. The curves in FIGURE 1 illustrate the solubility at various temperatures of sodium metaperiodate and sodium sulfate in aqueous solutions containing the solid phase of both salts.

It will be noted that sodium metaperiodate has low solubility and sodium sulfate high solubility in water at 37° C., the temperature of transition of the decahydrate to anhydrous sodium sulfate in the presence of solid phases of both sodium metaperiodate and sodium sulfate. The possibility of initial separation of a large proportion of pure sodium metaperiodate in a mixture with sodium sulfate is thus indicated. A succeeding or second crystallization will involve sodium sulfate and can be carried out by either of two methods. Cooling the sodium metaperiodate filtrate to the practical temperature of 26° C. will deposit sodium sulfate decahydrate as shown. Also the initial sodium metaperiodate filtrate may be evaporated to a definite weight and anhydrous sodium sulfate allowed to deposit at any temperature between 37° C. and 100° C.

Under appropriate conditions of concentration of sodium metaperiodate and sodium sulfate in aqueous solutions, which may be determined from the solubility Table I, sodium metaperiodate in nearly pure form may be separated by crystallization from sodium sulfate between 0° C. and 80° C. However, it is preferred to conduct the process of separation under the more economically favorable conditions of 37° C. for the isolation of sodium metaperiodate and then, if desired, at 26° C. or 80° C. for the isolation of sodium sulfate decahydrate or anhydrous sodium sulfate, respectively, as described in the examples.

Figure 2:
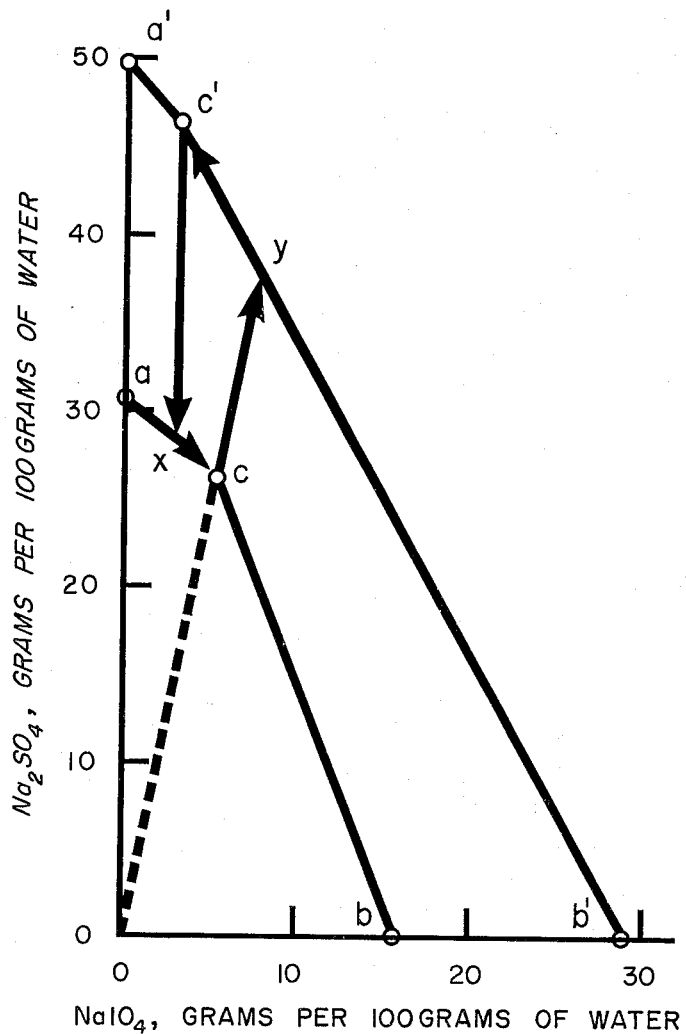

FIGURE 2 illustrates the isothermal curves for sodium metaperiodate and sodium sulfate at 26° C. and 37° C. The points $a$ and $a'$ represent the composition of solutions saturated with sodium sulfate at 26° C. and at 37° C., respectively. The points $b$ and $b'$ represent the composition of solutions saturated with sodium metaperiodate and points $c$ and $c'$ represent that of solutions saturated with both salts. The lines $ac$ and $a'c'$ represent the composition of solutions saturated with sodium sulfate in the presence of varying amounts of sodium metaperiodate and the lines $bc$ and $b'c'$ that of solutions saturated with sodium metaperiodate which contain varying amounts of sodium sulfate. Actual compositions were not determined except at the cardinal points of the curves and it is assumed that all of the lines are straight. It is seen that after removal of the first crop of sodium metaperiodate at 37° C. a solution of composition corresponding to $c'$ is obtained. When the solution is cooled to 26° C. $(x)$ deposition of sodium sulfate decahydrate occurs until the solution attains the composition at $c$. Removal of water by evaporation at 37° C. produces deposition of sodium metaperiodate at $y$ which continues along the line to $c'$. After separation of sodium metaperiodate, composition of the final solution is represented at $c'$.

The following examples illustrate the invention. The solubility data on which the process of separation illustrated in the examples is based are shown in Table I.

TABLE I

| Temperature, °C. | Solid phase | Composition of solution in grams of salt per 100 grams of water | |
|---|---|---|---|
| | | $NaIO_4$ | $Na_2SO_4$ |
| 0 | $NaIO_4$ | 2.5 | |
| | $Na_2SO_4.10H_2O$ | | 5.0 |
| | $NaIO_4 + Na_2SO_4.10H_2O$ | 1.6 | 4.2 |
| 26 | $NaIO_4$ | 15.5 | |
| | $Na_2SO_4.10H_2O$ | | 30.4 |
| | $NaIO_4 + Na_2SO_4.10H_2O$ | 5.4 | 26.4 |
| 37 | $NaIO_4$ | 28.6 | |
| | $Na_2SO_4$ | | 49.6 |
| | $NaIO_4 + Na_2SO_4$ | 3.4 | 46.0 |
| 80 | $NaIO_4$ | 60.0 | |
| | $Na_2SO_4$ | | 43.7 |
| | $NaIO_4 + Na_2SO_4$ | 23.0 | 31.2 |
| 100 | $NaIO_4$ | 75.1 | |
| | $Na_2SO_4$ | | 42.5 |
| | $NaIO_4 + Na_2SO_4$ | 51.0 | 23.4 |

The great difference in water solubility at 37° C. of sodium metaperiodate and sodium sulfate in the presence of both of their solid phases was totally unexpected. It was not known heretofore that the solubility of sodium metaperiodate of 28.6 grams per 100 grams of water at 37° C. would be reduced to as low a value as 3.4 grams in the presence of sodium sulfate, as shown in the above Table I. This phenomenon was taken advantage of for the development of a practical process for the separation of pure sodium metaperiodate in high yield from aqueous solutions containing both sodium metaperiodate and sodium sulfate. Also since the solubility of sodium metaperiodate at 26° C. was greater than at 37° C. and that of sodium sulfate as the decahydrate was less, it followed that sodium sulfate decahydrate could be isolated in pure form at 26° C. in the second crystallization as illustrated below.

*Example 1*

An aqueous solution containing 364 grams of sodium metaperiodate and 242 grams of sodium sulfate and 2,000 grams of water at 37° C. was used for illustration of the process. It is seen from Table I that at 37° C. 3.4 grams of sodium metaperiodate and 46.0 grams of sodium sulfate can be dissolved in 100 grams of water to reach saturation for the salts. To keep all of the sodium sulfate in the above solution at this temperature requires 525 grams of water. This quantity of water, however, will only dissolve 18 grams of sodium metaperiodate at saturation at 37° C., and the remaining 346 grams will thus be insoluble. Accordingly, the solution was concentrated by evaporation to remove 1475 grams of water and at 37° C. a first crop of crystalline sodium metaperiodate of 93 percent purity was isolated which weighed 368 grams. The filtrate upon cooling to 26° C. deposited 322 grams of sodium sulfate decahydrate as the second crop. From Table I at 26° C. the solubility of sodium metaperiodate in 100 grams of water saturated with both salts is 5.4 grams and of sodium sulfate decahydrate 26.4 grams (calcd. as $Na_2SO_4$). Projected to the filtrate of the first crop of sodium metaperiodate which contains 242 grams of sodium sulfate (equivalent to 549 grams sodium sulfate decahydrate) at 37° C., 351 grams of sodium sulfate decahydrate should precipitate upon cooling to 26° C. After filtration of the decahydrate at 26° C. the solution will contain 329 grams of water, 87 grams of sodium sulfate and 18 grams sodium periodate. Evaporation of the filtrate to leave 189 grams of water at a temperature of 37° C. should deposit 11 grams of sodium metaperiodate from solution saturated with both salts, according to the solubility table. Actually 6 grams of sodium metaperiodate were isolated.

A comparison of the recoveries expected from the solubility data in Table I and the actual recoveries of sodium metaperiodate and sodium sulfate decahydrate from the aqueous solution is shown in Table II.

TABLE II

| Crops | $NaIO_4$ | | $Na_2SO_4 \cdot 10H_2O$ | |
| --- | --- | --- | --- | --- |
| | Calcd.,[1] Percent | Isolated, Percent | Calcd.,[1] Percent | Isolated, Percent |
| 1 | 95 | 94 | | |
| 2 | | | 64 | 58 |
| 3 | 3 | 2 | | |

[1] Calculated from the solubility data in Table I.

Total recovery was 96 percent of nearly pure sodium metaperiodate in three crystallization steps.

The final filtrate containing 4 and 42 percent, respectively, of the sodium metaperiodate and sodium sulfate present in the original aqueous solution was treated with excess sodium hydroxide solution to precipitate insoluble trisodium paraperiodate. This salt, $Na_3H_2IO_6$, was recovered and could be returned to the process after neutralization with sulfuric acid according to the equation:

$$Na_3H_2IO_6 + H_2SO_4 \rightarrow NaIO_4 + Na_2SO_4 + 2H_2O$$

*Example 2*

This example illustrates the separation of crystalline sodium metaperiodate from an electrolysis solution prepared as disclosed in U.S. Patent No. 2,830,941. The electrolysis solution which contained 140 grams of periodic acid (equivalent to 156 grams of sodium metaperiodate) and 87 grams of sodium sulfate was neutralized to pH 3 with 40 percent sodium hydroxide solution. The resulting mixture was evaporated to a weight of 437 grams to obtain the optimum conditions for deposition of sodium metaperiodate at 37° C. required by the solubility data in Table I. The precipitated sodium metaperiodate was removed by filtration at 37° C. and after drying weighed 156 grams. Its purity was 94 percent. Washing the precipitate on the filter once with 20 milliliters of distilled water at 37° C. gave a recovery of 148 grams of sodium metaperiodate of 98 percent purity. The combined filtrate and washings containing 11 grams of sodium metaperiodate was reacted with excess sodium hydroxide solution and the trisodium paraperiodate that precipitated quantitatively was isolated for return to the process as described in Example 1.

The recovery of periodic acid as pure crystalline sodium metaperiodate was 91 percent of the amount of periodic acid in the original electrolysis solution.

Example 3 illustrates the removal of sodium metaperiodate at 37° C. and of anhydrous sodium sulfate at 80° C. from the sodium metaperiodate filtrate.

*Example 3*

An aqueous solution containing 364 grams of sodium metaperiodate and 242 grams of sodium sulfate and 2,000 grams of water at 37° C. was evaporated to remove 1475 grams of water and at 37° C. a first crop of crystalline sodium metaperiodate was isolated which weighed 368 grams (93% pure). The filtrate contained 18 grams of sodium metaperiodate, 242 grams of sodium sulfate and 525 grams of water. It will be seen from Table I that at 80° C., 23 grams of sodium metaperiodate and 31.2 grams of sodium sulfate can be dissolved in 100 grams of water to reach saturation for the salts. To keep all of the sodium metaperiodate in solution would require 78 grams of water. This quantity of water, however, will only dissolve 24 grams of sodium sulfate at saturation at 80° C. The sodium metaperiodate filtrate above was evaporated to remove 447 grams of water and at 80° C. anhydrous sodium sulfate crystallized out in the amount of 218 grams (Crop 2) or 90 percent of the sodium sulfate present. After filtration at 80° C. the filtrate contained 24 grams of sodium sulfate, 18 grams of sodium metaperiodate and 78 grams of water. Evaporation of the filtrate to leave 53 grams of water at a temperature of 37° C. deposited 16 grams (Crop 3) of sodium metaperiodate from solution (90% of the 18 grams present).

A comparison of the recoveries expected from the solubility data in Table I and the actual recoveries of sodium metaperiodate and anhydrous sodium sulfate from the aqueous solution is shown in Table III.

TABLE III

| Crops | Percent recovery | | | |
| --- | --- | --- | --- | --- |
| | Sodium metaperiodate | | Anhydrous sodium sulfate | |
| | Calcd.[1] | Isolated | Calcd. | Isolated |
| 1 | 95 | 94 | | |
| 2 | | | 90 | 86 |
| 3 | 4.4 | 1.6 | | |

[1] Calculated from the solubility data in Table I.

Total recovery of nearly pure sodium metaperiodate was 96 percent in three crystallization steps.

*Example 4*

An aqueous solution containing 102 grams of sodium metaperiodate and 84 grams of sodium sulfate and 3,000 grams of water at 37° C. was evaporated to remove 1,000 grams of water and cooled to 0° C. Sodium metaperiodate crystallized out and after filtering at 0° C. and drying, 70 grams of nearly pure product was obtained.

Example 5

An aqueous solution containing 100 grams of sodium metaperiodate and 84 grams of sodium sulfate and 2,000 grams of water at 26° C. was evaporated to remove 1,730 grams of water and heated to 80° C. Sodium metaperiodate crystallized out. After filtering at 80° C. and drying, 38 grams of nearly pure product was obtained.

We claim:

1. A method of recovering at least 90% of substantially pure sodium metaperiodate from a generation solution containing periodic acid and sodium sulfate obtained in the electrolytic oxidation of iodine to periodic acid in the presence of sodium sulfate, said method comprising adding sodium hydroxide to said generation solution to partially neutralize it until a pH of 3 is obtained, evaporating the partially neutralized solution until the sodium sulfate concentration is 46.0 parts per 100 parts of water, adjusting the temperature of the evaporated solution to 37° C. to cause precipitation of crystalline sodium metaperiodate, separating the precipitated crystalline sodium metaperiodate by filtration at 37° C., adjusting the volume of the filtrate to obtain a concentration of residual sodium metaperiodate in said filtrate of about 1.6 to 3.4 parts in 100 parts of water, then adjusting the temperature to between 0° and 37° C. to cause precipitation of crystalline sodium sulfate decahydrate, separating the precipitated sodium sulfate decahydrate by filtration at a temperature between 0° and 37° C., evaporating the filtrate from the sodium sulfate decahydrate separation until a concentration of residual sodium sulfate of 46 parts in 100 parts of water is obtained, adjusting the temperature of the evaporated solution to 37° C. to cause precipitation of additional crystalline sodium metaperiodate, and separating said crystalline sodium metaperiodate at 37° C.

2. A method of recovering at least 90% of substantially pure sodium metaperiodate from a generation solution containing periodic acid and sodiumسulfate obtained in the electrolytic oxidation of iodine to periodic acid in the presence of sodium sulfate, said method comprising adding sodium hydroxide to said generation solution to partially neutralize it until a pH of 3 is obtained, evaporating the partially neutralized solution until the sodium sulfate concentration is 46.0 parts per 100 parts of water, adjusting the temperature of the evaporated solution to 37° C. to cause precipitation of crystalline sodium metaperiodate, and separating the precipitated crystalline sodium metaperiodate at 37° C.

3. A process for recovering at least 90% of substantially pure crystalline sodium metaperiodate from an aqueous solution containing essentially only sodium metaperiodate and sodium sulfate which comprises evaporating the solution until the sodium sulfate concentration is 46.0 parts per 100 parts of water, adjusting the temperature of the evaporated solution to 37° C. to cause precipitation of crystalline sodium metaperiodate, separating the precipitated crystalline sodium metaperiodate by filtration at 37° C., adjusting the volume of the filtrate to obtain a concentration of residual sodium metaperiodate in said filtrate of about 1.6 to 3.4 parts in 100 parts of water, then adjusting the temperature to between 0° and 37° C. to cause precipitation of crystalline sodium sulfate decahydrate, separating the precipitated sodium sulfate decahydrate by filtration at a temperature between 0° and 37° C., evaporating the filtrate from the sodium sulfate decahydrate separation until a concentration of residual sodium sulfate of 46 parts in 100 parts of water is obtained, adjusted the temperature of the evaporated solution to 37° C. to cause precipitation of additional crystalline sodium metaperiodate, and separating said crystalline sodium metaperiodate at 37° C.

4. A process for recovering at least 90% of substantially pure crystalline sodium metaperiodate from an aqueous solution containing essentially only sodium metaperiodate and sodium sulfate which comprises evaporating the solution until the sodium sulfate concentration is 46.0 parts per 100 parts of water, adjusting the temperature of the evaporated solution to 37° C. to cause precipitation of crystalline sodium metaperiodate, and separating the precipitated crystalline sodium metaperiodate at 37° C.

References Cited in the file of this patent

UNITED STATES PATENTS 2,830,941    Mehltretter _____ Apr. 15, 1958

OTHER REFERENCES

Booth: Inorganic Synth., vol. I, 1939, pages 168–171.